United States Patent [19]

Terhune et al.

[11] Patent Number: 4,521,373

[45] Date of Patent: Jun. 4, 1985

[54] LIQUID LEVEL SENSOR

[75] Inventors: James H. Terhune; John P. Neissel, both of San Jose, Calif.

[73] Assignee: General Electric Company, San Jose, Calif.

[21] Appl. No.: 410,578

[22] Filed: Aug. 23, 1982

[51] Int. Cl.³ ............................................. G21C 17/00
[52] U.S. Cl. .................................. 376/258; 376/247; 73/295
[58] Field of Search ................ 376/258, 247; 374/142, 374/148; 73/292, 295; 340/606, 608

[56]  References Cited

U.S. PATENT DOCUMENTS

| | | | |
|---|---|---|---|
| 2,894,390 | 7/1959 | Talbot | 73/295 R |
| 3,017,592 | 1/1962 | Keller et al. | 374/111 |
| 3,366,942 | 1/1968 | Deane | 340/608 |
| 3,392,581 | 7/1968 | Miller | 73/304 C |
| 3,432,840 | 3/1969 | Neapolitakis et al. | 340/59 |
| 3,461,446 | 8/1969 | Sergeant | 73/295 R |
| 3,475,960 | 11/1969 | Miller | 73/304 R |
| 3,485,100 | 12/1969 | Petersen | 73/295 R |
| 3,701,138 | 10/1972 | Pulliam et al. | 340/622 |
| 3,735,638 | 5/1973 | Miller | 73/304 R |
| 3,760,352 | 9/1973 | Marcoux | 73/295 R |
| 3,868,620 | 2/1975 | McBride, Jr. et al. | 338/28 |
| 3,898,638 | 8/1975 | Deane et al. | 340/606 |
| 4,036,053 | 7/1977 | Jenkins | 73/295 R |
| 4,053,874 | 10/1977 | Glaser | 73/295 R |
| 4,135,186 | 1/1979 | Minorikawa et al. | 73/295 R |
| 4,377,550 | 3/1983 | Tokarz | 376/258 |
| 4,406,011 | 9/1983 | Burns | 376/258 |
| 4,414,177 | 11/1983 | Tokarz | 376/258 |
| 4,418,035 | 11/1983 | Smith | 376/258 |
| 4,449,403 | 5/1984 | McQueen | 376/258 |

OTHER PUBLICATIONS

Electronics Review, pp. 53–56, (7/5/79).

Primary Examiner—Sal Cangialosi
Attorney, Agent, or Firm—Ivor J. James, Jr.; Samuel E. Turner; Raymond G. Simkins

[57] ABSTRACT

A liquid level detector, or detector array, for insertion into the pressure vessel of a nuclear reactor, or into any liquid-containing vessel, for that matter. A coaxial cable supports the detector, which includes a sensing element having a positive temperature-coefficient of electrical resistivity. The detector is driven by a constant current source of electricity and the presence of liquid is determined by making a resistance measurement.

8 Claims, 4 Drawing Figures

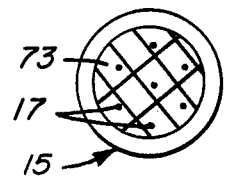
Fig. 3
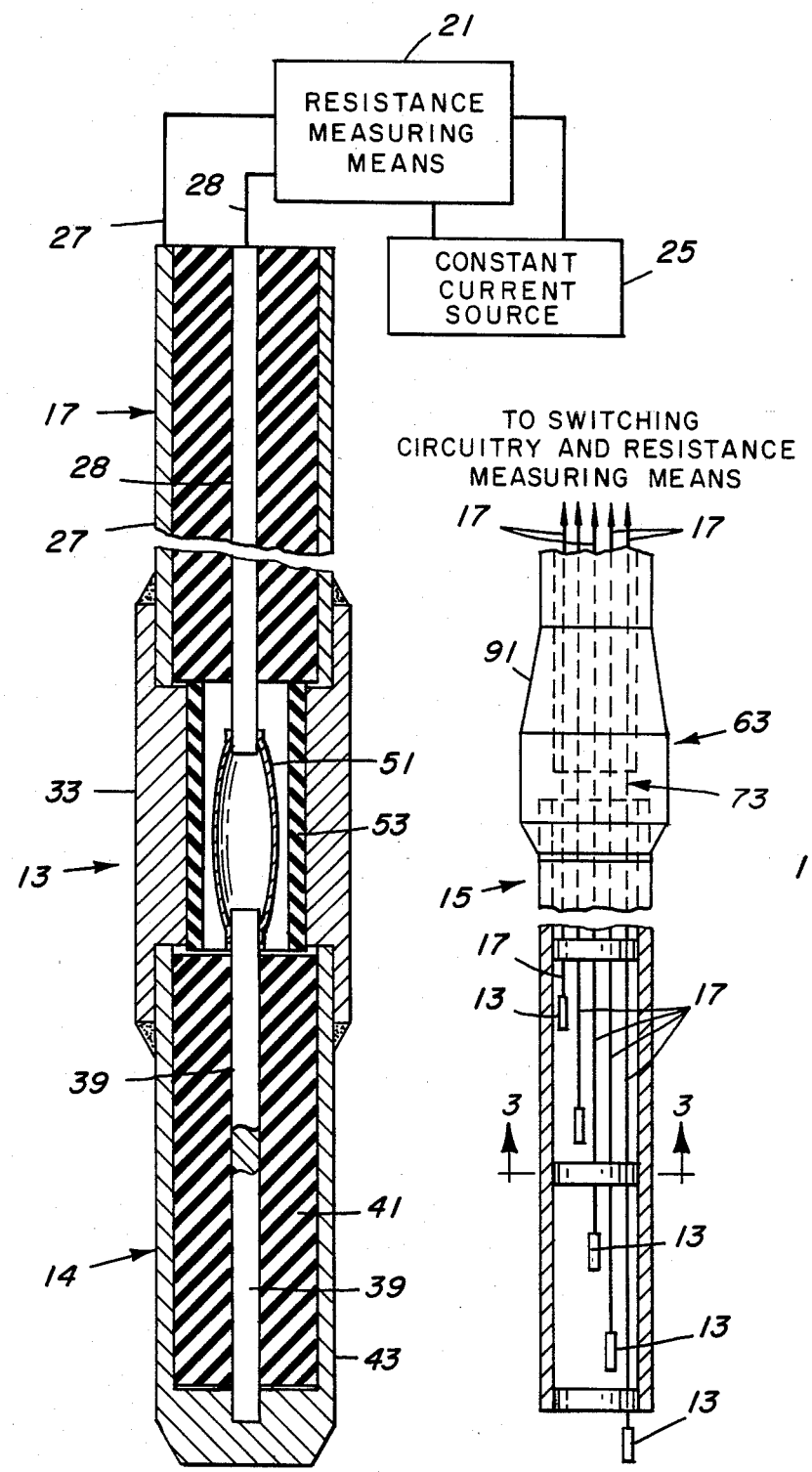
Fig. 1
Fig. 2
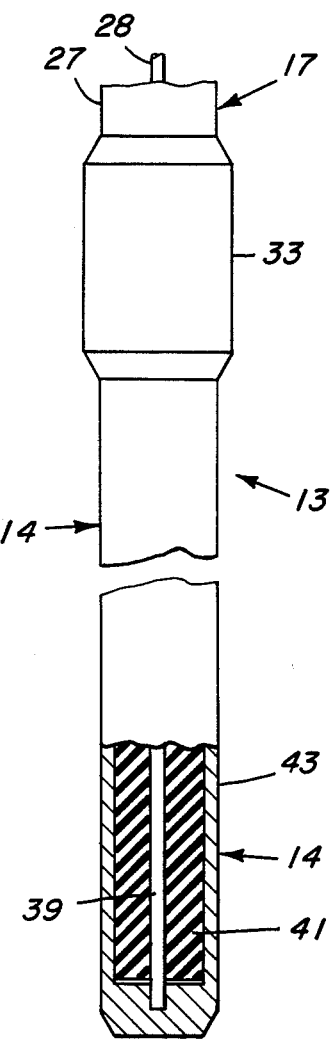
Fig. 4

LIQUID LEVEL SENSOR

BACKGROUND OF THE INVENTION

The present invention relates to detecting the level of a liquid such as water held in many different kinds of containers. The liquid may be contained under pressure as in the case of nuclear pressure vessels. The liquid level detectors of interest herein have a positive temperature-coefficient of electrical resistivity and are driven by a constant current source. Such detectors may be used for level sensing in boiling water and pressurized water reactors. However, they may also be employed to measure liquid levels in many other kinds of containers.

The detectors themselves can be inserted into their respective containers from above or below, or even through their sides. In the particular case of a pressurized water reactor, the detectors are generally inserted through the top of the pressure vessel. In boiling water reactors, insertion is typically from below, because of a difference in construction.

In nuclear reactors, generally, the pressure vessel typically contains a core of nuclear fuel that is cooled to prevent core degradation. Cooling the nuclear fuel concomitantly heats the water flowing through the core of the reactor. At a sufficiently high temperature, the water changes into steam and may drive a turbine generator to produce electricity.

More details regarding nuclear reactors and power generation are found in Energy Technology Handbook, edited by Douglas M. Considine and published by McGraw Hill Book Company in 1977.

Considering the pressure vessel of a reactor to be positioned vertically, the water level in the pressure vessel tends to vary radically from the center of the vessel depending upon the internal flow of water. For this reason it is desirable to distribute level detectors at various locations throughout the pressure vessel.

In pressurized water reactors the level detectors are particularly useful near the top of the pressure vessel, since these reactors are normally completely filled with water. On the other hand, in boiling water reactors, the normal operating water level extends only a few feet above the core itself. Consequently, the level sensors are primarily useful in that general threshold region.

The level detectors discussed herein resist the flow of electric current. This generates heat and changes the temperature in the detector, depending upon the level of the electric current passing through the detector and the nature of the cooling at the detector surface. When the detector is immersed in a favorable heat dissipation medium such as water, the heat generated tends to dissipate from the detector more rapidly than it would in air or another gaseous environment. The relatively faster dissipation of heat in liquids, specifically water, causes the temperature of the level detector to drop when the level detector is placed in liquid, or when the liquid level rises to cover the detector wholly or partially.

A rise in the temperature of the detector causes its resistance to increase. Table I illustrates the relationship between temperature and resistance changes in the level detector employing a positive temperature coefficient material as a sensing element, which is driven by a constant voltage or, alternatively, by a constant current source.

TABLE I

| Changes in temperature or resistance (primary and secondary), and in current | $\Delta T_1$ | $\Delta R_1$ | $\Delta I$ | $\Delta T_2$ | $\Delta R_2$ |
|---|---|---|---|---|---|
| Detector driven by a constant voltage source | + | + | − | − | − |
|  | − | − | + | + | + |
| Detector driven by a constant current source | + | + | ∅ | + | + |
|  | − | − | ∅ | − | − |

For example, with a constant voltage source driving the level detector, the current "I" through the detector increases or decreases by an amount $\Delta I$, depending upon whether the environment of the level detector changes from gas to liquid, or from liquid to gas. For example, when the detector environment changes from liquid to gas, detector resistance increases by an initial amount of $\Delta R_1$ with the increased initial temperature change $\Delta T_1$ caused by decreased heat dissipation. This initial or primary resistance increase $\Delta R_1$ decreases the current through the detector, if it is driven by a constant voltage source, and in turn causes a secondary temperature decrease $\Delta T_2$ due to the diminished heat generation. This results in an overall reduced temperature change $\Delta T_1 + \Delta T_2$ and a reduced net resistance $\Delta R_1 + \Delta R_2$. Simply stated, this amounts to reduced sensitivity for the level detector, because of its being constant voltage driven.

With a constant current source driving the level detector, the current "I" through the detector does not change with a change of environment. But when, for example, the detector environment changes from liquid to gas, detector resistance increases by an initial amount of $\Delta R_1$, with the increased initial temperature change $\Delta T_1$ caused by decreased heat dissipation. This initial or primary resistance increase $\Delta R_1$ is not accompanied by a decrease in current through the detector, if it is driven by a constant current source, and the result of the same current flowing through a higher resistance is an increase in heat generation accompanied by a temperature increase $\Delta T_2$. This results in an overall increased temperature change $\Delta T_1 + \Delta T_2$ and an increased resistance $\Delta R_1 + \Delta R_2$. Simply stated, this amounts to increased sensitivity for the level detector, because of its being constant current driven.

In a constant current driven level detector operating with positive temperature coefficient of resistivity sensing materials, there is accordingly an increased sensing capacity caused by an increase $\Delta R_2$ in the primary resistance change $\Delta R_1$. The resistance change $\Delta R_1$ caused by a change of medium in the immediate proximity of the detector (e.g., a drop in water level causing the level sensor to become resident in air or steam) causes no current change with a constant current source. Therefore, secondary effects occur to increase sensitivity.

OBJECTS OF THE INVENTION

It is accordingly an object of the invention herein to provide a highly sensitive positive temperature coefficient liquid level detector for measuring the level of liquid in vessels of all kinds.

It is an object of the invention herein to provide for the application of a constant current source to drive the level detector, whereby an increase in detector sensitivity is obtained.

It is a further object of the instant invention to utilize a positive temperature coefficient of resistivity material to promote an increase in detector sensitivity.

It is an object of the present invention to provide a new and improved resistance-type liquid level detector with an enhanced dependence upon changes in environment from liquid to gas.

It is a further object of the instant invention to provide a liquid level detector which can determine the level of both ionic and non-ionic liquids.

It is an object of the instant invention to provide a liquid level detector for continuously measuring liquid level changes across predetermined ranges of levels.

It is a further object of the instant invention to provide a constant current source liquid level detector for discretely measuring the presence of liquid at selected locations.

Another object of the instant invention is to enhance the sensitivity of a positive temperature coefficient of resistivity liquid level detector for determining the level of liquid in the pressure vessels of nuclear reactors.

SUMMARY OF THE INVENTION

The objects above as well as others not explicitly set forth are accomplished by the invention herein. The invention utilizes a constant current source in conjunction with a liquid level detector including a sensing element having a positive temperature-coefficient of electrical resistivity. In one embodiment the level detector establishes the absence or presence of liquid by noting the change in resistance of the sensing element. In another case the invention calls for the use of multiple liquid level detectors in a fixture or supporting structure mounted in a nuclear reactor pressure vessel. In even another case a liquid level detector with a substantially elongated sensing element is disclosed.

In general, the sensing element of the level detector is surrounded by an electrically insulating and thermally conducting sleeve. The sleeve in turn is enclosed in an electrically conducting outer jacket which is connected at its lower end to the tip of the sensing element. The level detector includes a coaxial cable and a connector which electrically connects the coaxial cable with the sensing element and outer jacket. The connector limits heat transfer between the coaxial cable and both the sensing element and the outer jacket. To accomplish this purpose the connector includes inner and outer pieces. The inner piece may be in the form of a clam shell. An electrically insulative piece separates the inner and outer pieces.

DESCRIPTION OF THE DRAWING

FIG. 1 is a longitudinal cross-section of the liquid level detector.

FIG. 2 is a longitudinal cross-section of the lower portion of a fixture or supporting structure for holding plural level detectors of the kind shown in FIG. 1.

FIG. 3 is a cross-section of the fixture referred to in FIG. 2 at line 3—3.

FIG. 4 shows a level detector similar to the one shown in FIG. 1, but having an elongated sensing element or detection region.

DESCRIPTION OF A PREFERRED EMBODIMENT

As noted, the drawing shows three versions of the instant invention. In particular, FIG. 1 of the drawing shows a liquid level detector 13 with a relatively short detection region 14. In FIG. 2, it can be observed that numerous liquid level detectors 13 are disposed at several levels within a fixture or supporting structure 15. Finally, in FIG. 4, there is shown a liquid level detector 13 having a relatively long or extended detection region 14.

Focusing initially on the top of FIG. 1, there is shown a coaxial cable 17 connected to a resistance measuring means 21 which in turn is suitably electrically connected to a constant current source 25. The coaxial cable 17 includes outer and inner conductors respectively at 27 and 28 and suitably separated by an electrically insulating sleeve shown. The coaxial cable 17 is suitably coupled to a connector 33. The level detector 13 includes a sensing element 39 constructed of a material having a positive temperature coefficient of resistivity. Suitable materials are for example Monel ® metal or manganese steel. Laterally surrounding this sensing element 39 there is an insulative sleeve 41 having high electrical resistance and thermal conductivity. An example of a suitable material for the sleeve 41 is beryllium oxide.

Laterally surrounding the sleeve 41, and thereby also surrounding sensing element 39, is an outer jacket 43, which conducts both heat and electricity. At its lower end, this jacket 43 is suitably electrically connected with the sensing element 39. This connection can be established by brazing, for example.

A brief examination of FIG. 4 shows that the detection region 14 can be significantly longer than shown in FIG. 1, which permits the detector 13 to continuously measure variations in liquid level, provided that the sensing element 39 thereof is greater in length than transient fluctuations in liquid level. Otherwise, the level detectors 13 of FIGS. 1 and 4 are similar in structure, both including a coaxial cable 17, a detection region 14, and a connector 33 joining the two.

The connector 33 employed is a specialized fitting for holding the coaxial cable 17 in physical and electrical contact with the outer jacket 43 and the sensing element 39 of the level detector 13. Its structure and material composition limit the transfer of heat across the connector 33.

The connector 33 is generally tubular, as shown in FIG. 1. A resilient sleeve portion 51 of the connector 33 electrically connects the sensing element 39 with the inner conductor 28 of the coaxial cable 17. This sleeve portion 51 is radially expandable and contractable for accommodating longitudinal thermal expansion and contraction of the sensing element 39 during normal operation. The small cross-sectional area of the sleeve 51 limits undesirable axial heat transfer to the coaxial cable 17.

The resilient sleeve portion 51 is surrounded by an insulative tubular portion 53 and the outer tubular portion of the connector 33. The insulative tubular portion 53 electrically insulates the resilient sleeve portion 51 from the outer tubular portion of the connector 33. The outer tubular portion of the connector 33 electrically couples, but thermally insulates, the outer conductor 27 with respect to jacket 43.

Turning now to a description of FIG. 2, numerous level detectors 13 of the kind shown in FIG. 1 are supported by coaxial cables 17. The supporting structure 15 for the cables 17 includes a fitting 91 which is suitable for insertion into the pressure vessel of a nuclear reactor, either from above or below. As shown in FIG. 2, the supporting structure 15 is disposed for insertion through the top of the pressure vessel. Switching circuitry (not shown) connects the various coaxial cables 17 selectively with the resistance measuring means 21, as suggested in FIG. 1. A constant current source 25, as also shown in FIG. 1, drives the particular connected level detector 13, providing an indication of whether the position of the particular level detector 13 is instantly in a liquid or gaseous environment.

FIG. 3 illustrates an indicated cross-section at line 3—3 of FIG. 2. It shows the cables 17 held in place within a suitable frame 73 of the supporting structure 15. The detectors 13 are positioned within the supporting structure 15 by brazing the respective coaxial cables 17 into place within frame 73 and structure 15.

The fitting 91 is tightly secured within a port (not shown) in the top or bottom of the pressure vessel in which it is installed. This prevents leakage from the pressure vessel even under high pressure conditions. A nut (not shown) can securely hold the structure 15 in place on the pressure vessel.

In FIG. 4, an elongated version of the level detector 13 is shown. By virtue of its length, the detector 13 can provide level information along a continuum or substantial range of distance. In operation a portion of the detector 13 shown in FIG. 4 will generally be immersed, while the remainder stays in air or gas. Thus, some of the detector 13 is subject to relatively effective, and the remainder to less effective heat dissipation. Resistance measurement can accordingly be made with the detector of FIG. 4 to observe continuous changes in resistance along the entire length of the sensing element 39. On the other hand, the detector of FIG. 2 indicates only the presence or absence of liquid at the particular position at which the level detectors are present.

The foregoing description is susceptible of reasonable modifications that may occur to those skilled in the art. However, this invention is not meant to be limited to the embodiment just shown and described. The claims set forth the inventive concept and are intended to cover all modifications coming within the spirit and scope of the invention described herein.

What is claimed is:

1. A liquid level detector for insertion into the pressure vessel of a nuclear reactor, said pressure vessel suitable for containing liquid and gaseous material, said detector comprising coaxial means for conducting electricity, said coaxial means including an inner conductor and an outer conductor separated by an insulative sleeve, said coaxial means being electrically connected to a source of constant current and a resistance measuring means; a sensing means for responding positively in terms of electrical resistance to an increase in temperature; a heat-conductive and electrically-insulative sleeve means for laterally surrounding said sensing means; an electrically-conductive and heat-conductive jacket means for laterally surrounding said sleeve means, said sensing means and said jacket means being electrically connected at a common end; and thermally limiting means for electrically connecting the outer conductor of said coaxial means with said jacket means, surrounding resilient sleeve means for electrically connecting said inner conductor of said coaxial means with said sensing means, whereby the level of liquid in said pressure vessel is detectable in terms of a variation in resistance of said sensing means.

2. A plurality of the liquid level detectors according to claim 1, distributed at selected levels within a supporting structure having a fitting for insertion into the pressure vessel of said nuclear reactor, the coaxial cables of said detectors effective for distributing said detectors at various locations of said supporting structure.

3. The detector of claim 1, wherein said sensing means is greater in length than transient fluctuations in the level of liquid contained in said pressure vessel.

4. The detector of claim 1, wherein said resilient sleeve means is laterally surrounded with an electrically insulative sleeve.

5. A detector for determining the level of liquid in the pressure vessel of a nuclear reactor comprising a resistive means for resisting passage of electric current, said resistive means having a positive temperature coefficient of electrical resistivity and including an end portion; a sleeve means for electrically insulating said resistive means, said sleeve means being thermally conductive and surrounding said resistive means over a substantial portion of its length; jacket means for conducting current and effective for transferring heat, said jacket means laterally surrounding said sleeve means and electrically in communication with said end portion of said resistive means; means for providing a constant current through said resistive means and said jacket means; and resistance measuring means coupled across said resistive means, whereby the level of liquid in said pressure vessel is measurable in terms of a function of the total resistance of said resistive means.

6. The detector of claim 5, comprising a coaxial cable including an inner and an outer conductor and an electrically insulative sleeve therebetween, said outer conductor being in electrical communication with said jacket means and said inner conductor being in electrical communication with said resistive means.

7. The detector of claim 5 or 6, wherein said means for providing a constant current includes a means for electrically connecting said coaxial cable with said resistive means and said jacket means, and effective for limiting the transfer of heat therebetween.

8. The detector of claim 6, wherein said inner conductor is electrically connected with said resistive means.

* * * * *